July 26, 1966 J. H. McAULEY ETAL 3,262,546
CONVEYOR CHAIN WITH OPPOSITELY DIRECTED PUSHERS
Filed Jan. 27, 1965 3 Sheets-Sheet 1
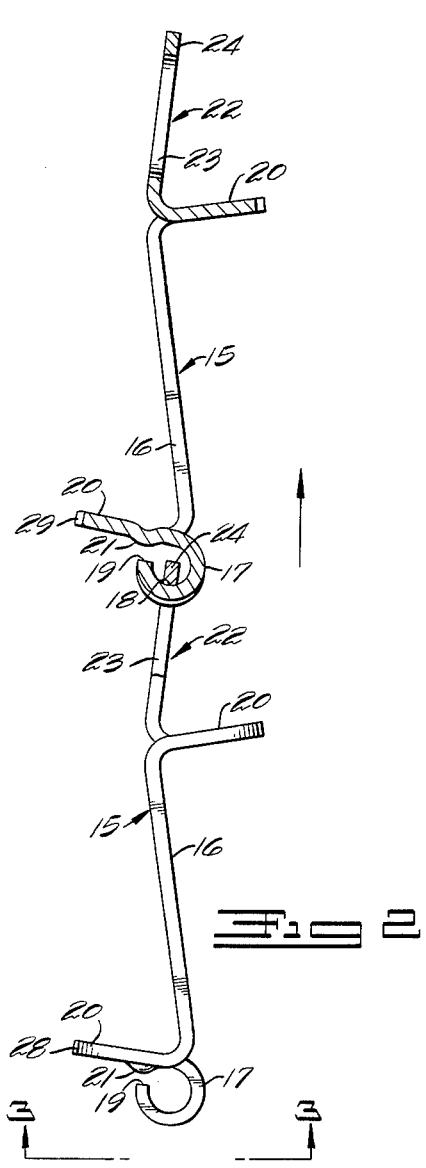
INVENTORS.
JAMES H. McAULEY
THOMAS G. RAUCH
BY MAHONEY, MILLER & RAMBO
BY Wm. V. Miller
ATTORNEYS July 26, 1966  J. H. McAULEY ETAL  3,262,546
CONVEYOR CHAIN WITH OPPOSITELY DIRECTED PUSHERS
Filed Jan. 27, 1965  3 Sheets-Sheet 2

INVENTORS
JAMES H. McAULEY
THOMAS G. RAUCH
BY MAHONEY, MILLER & RAMBO
BY Wm. V. Miller
ATTORNEYS

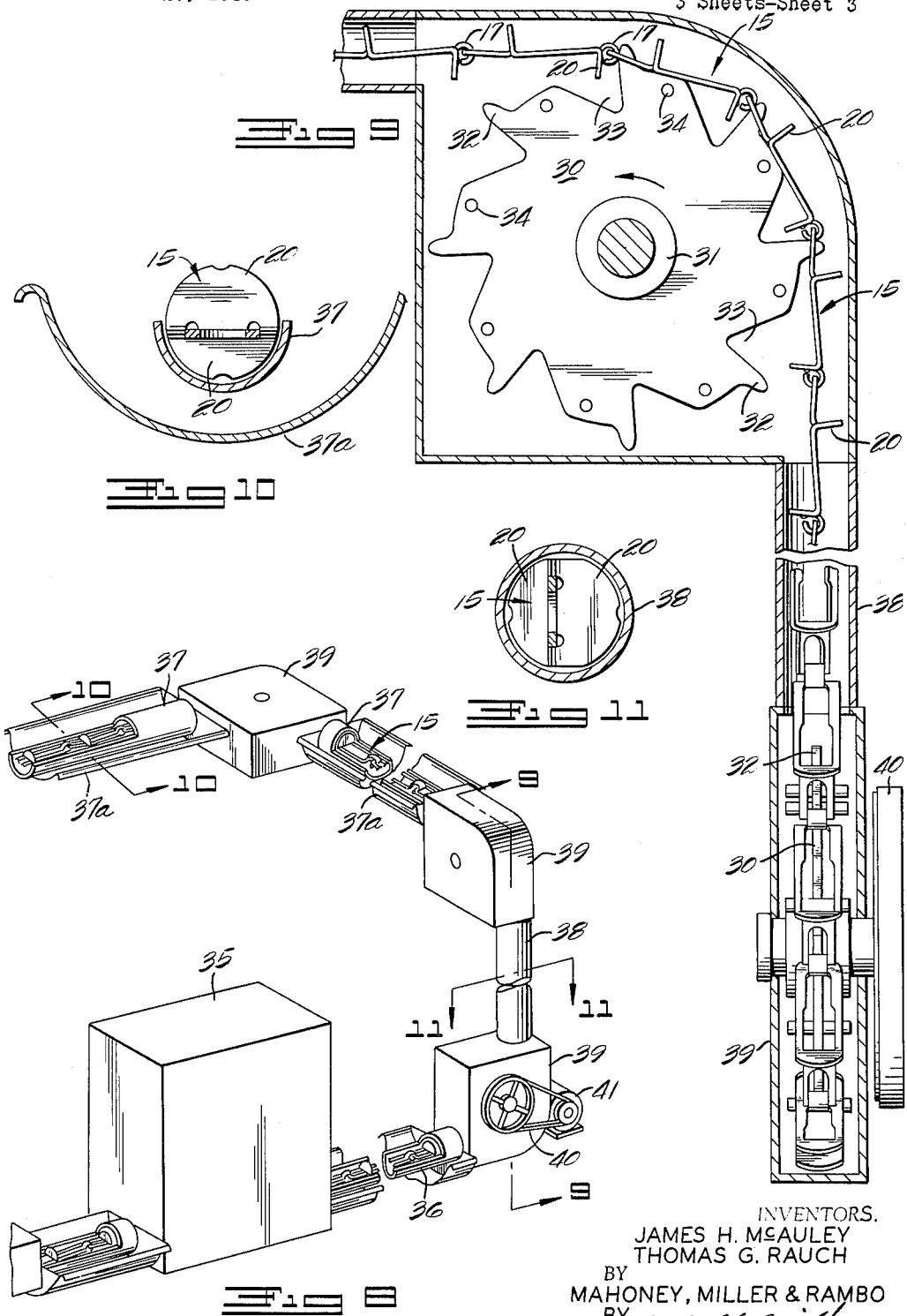

United States Patent Office 3,262,546
Patented July 26, 1966

3,262,546
CONVEYOR CHAIN WITH OPPOSITELY DIRECTED PUSHERS
James H. McAuley, Bremen, and Thomas G. Rauch, Lancaster, Ohio, assignors to McAuley Manufacturing, Inc., Bremen, Ohio, a corporation of Ohio
Filed Jan. 27, 1965, Ser. No. 428,301
12 Claims. (Cl. 198—172)

Our invention relates to a material-moving flexible chain. It has to do, more particularly, with a chain which is particularly suitable for moving loose-particle or granular material, such as animal or poultry feed, along a feed conduit which has components extending in both horizontal and vertical directions. The chain can also handle, in a conduit or trough, bulky feed or roughage material and can even handle aggregate, sand, etc.

The chain embodying the present invention is composed of interlocking or interfitting links. The construction of the individual links is such that when a plurality of them are hooked together, the resulting chain has the desired degree of flexibility. The chain is especially designed for traveling along an open conduit, such as a trough having a semicircular bottom, or through a closed conduit or tube of circular cross section. It is sufficiently flexible that it can travel along horizontal, vertical or inclined runs of the conduit. It is of such a nature that in the closed or tubular conduit, material-moving blades on any one link of the chain will fill the cross-sectional area of the conduit to thereby effectively move the material therethrough. These blades are preferably provided as a pair of opposed blades on each link which will counter-balance each other as they act in moving the material through the tube. Also, each of the blades is angled in the direction of travel of the chain to give it a plowing effect so that as it engages the material, it tends to move the material inwardly away from the wall of the conduit onto the body of the link to more effectively carry the material along. The chain can twist about its longitudinal axis to permit it to go around angles in different planes and even though it twists in the tubular conduit, the material-moving blades will still fill the cross-sectional area of the conduit to effectively move the material therealong regardless of whether the conduit is horizontal, vertical or inclined. The chain of this invention is formed of links made as simple economical stampings with a minimum waste of material, which can be produced and simultaneously assembled in a low-cost process into any desired lengths. Also, although there is no danger of accidental disconnection of links during usage, the links can be disassembled with ease when it is desired to do so.

In the accompanying drawings we have illustrated links and a chain embodying our invention, a blank from which each of the links can be made, and examples of how the chain can be used.

In these drawings:

FIGURE 1 is a plan view, partly broken away, of interlocked links of a length of chain embodying our invention.

FIGURE 2 is an edge elevational view of the length of chain.

FIGURE 3 is an end view of a link of the chain taken at the position indicated by line 3—3 of FIGURE 2.

FIGURE 8 is a schematic perspective view illustrating an installation using the chain of our invention.

FIGURE 9 is an enlarged vertical sectional view taken along line 9—9 of FIGURE 8.

FIGURE 10 is an enlarged vertical transverse sectional view taken along line 10—10 of FIGURE 8.

FIGURE 11 is an enlarged horizontal sectional view taken along line 11—11 of FIGURE 8.

Figure 4:
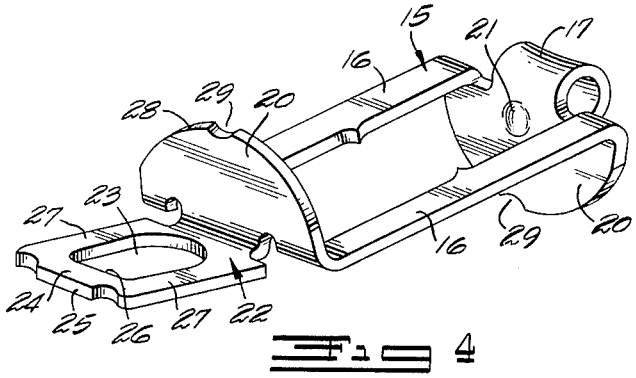
FIGURE 4 is a perspective view of a link of the chain.

With reference to the drawings, we have illustrated in FIGURES 1, 2 and 3, a flexible chain composed of the interlocking links 15 which are so connected together that the links may pivot relative to each other normal to the plane of travel of the links, may swing relative to each other in the plane of the links, or may twist relative to each other about the longitudinal axis of the chain. An important feature of this present invention is that each link is provided with a pair of longitudinally spaced and oppositely projecting flights or push-blades 20 which project in opposite directions from the body of the link and plane of movement of the chain and extend transversely thereof completely across the chain body so as to engage and push material through the conduit in which the chain operates, especially if it is of closed tubular cross section.

Each push-blade 20 is preferably semicircular so that the entire cross-sectional area of a closed circular conduit or tube will be filled by the oppositely projecting push-blades which will push the material along in a horizontal conduit and will push it or lift it vertically in a vertical conduit. These blades have relatively sharp outer edges and the blades are canted or angled forwardly (FIGURE 2) relative to the direction of movement of the chain. The result is that there is a plowing effect created on the material and the angled blades will tend to move the material inwardly, as it pushes it through the tube, from the wall of the tube onto the bodies of the respective links so that the material will be more effectively transported by the chain. This will prevent the material from building up along the wall of the tube which might cause jamming of the chain in the tube. Also, since the two opposed blades 20 are of identical size and project to the same extent in opposite directions, they will tend to balance each other and tend to keep the chain in alignment without twisting although it can twist whenever necessary, as when going around corners.

Each of the links 15 takes the form illustrated in the drawings and preferably is produced by a die-cutting and stamping operation. It includes what may be termed a flat body portion which consists of the flat connecting side portions 16 that are disposed in laterally-spaced, substantially parallel relationship and are of considerable length. These elongated members 16 are integrally joined to the two push-blades 20 at their opposite ends and the push-blades project outwardly in opposite directions from the flat common plane of the portions 16. The one blade 20 is at the rear end of the link, relative to its intended direction of movement, adjacent the hook shaped barrel formation 17 which is integral therewith and projects outwardly from the plane of the members 16 in the opposite direction and then curls inwardly and forwardly toward the member 20. The barrel 17 extends transversely and is provided with a transversely curved convex inner surface 18 (FIGURE 1). Its extremity 19 is straight across transversely, as indicated in FIGURE 2, and is spaced from the blade 20. The blade 20 is provided with a dimple or convex projection 21 which projects into the space toward the edge 19. Ahead of the other oppositely projecting blade 20 is the sprocket tooth receiving loop portion 22 which is integrally joined at its rear to the blade and is angled slightly relative to the common plane of the members 16 in the direction the blade 20 extends. The portions 16 may be termed the flat body of the link with the blades 20 projecting from opposite ends thereof and in opposite directions. These blades 20 are both angled forwardly relative to the portions 16 when considering the direction of intended travel of the chain as indicated best in FIGURE 2. The outer edges of these blades 20 are relatively sharp and are curved convexly transversely, as indicated at 28, being provided with notches 29 located midway along the respective edges.

The tooth-receiving loop 22 is provided with a central tooth-receiving opening 23 and has a pintle portion 24 formed at its forward end. This portion 24 is straight across transversely and has straight outer and inner edges 25 and 26, respectively. The pintle portion is integrally joined at its outer ends to the side portions 27 which are disposed in laterally spaced parallel relationship to provide the opening 23 therebetween.

Figure 5:
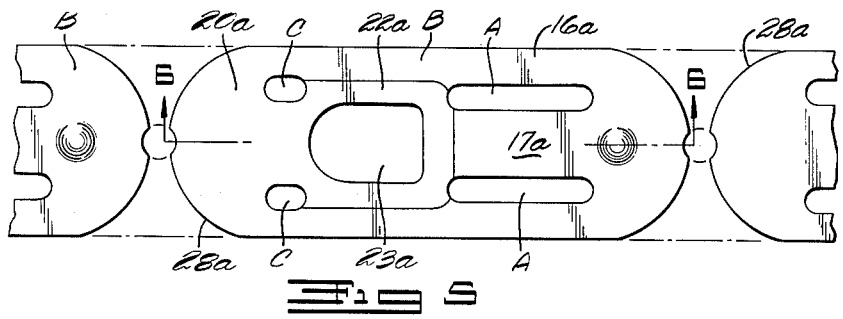
FIGURE 5 is a diagrammatic view illustrating a blank from which a link of the chain can be made.
Figure 6:
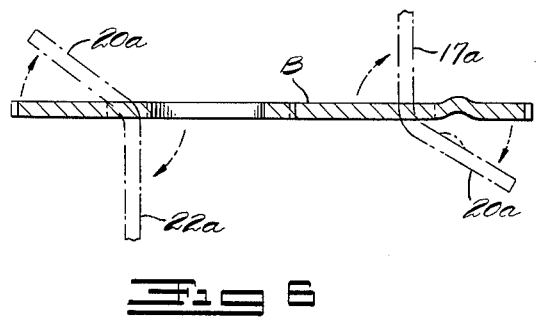
FIGURE 6 is a longitudinal sectional view taken along line 6—6 of FIGURE 5.

Successive links may be formed from a strip of metal, such as sheet steel of suitable gauge, as indicated diagrammatically in FIGURE 5, although other methods may be employed. Each blank B may be cut successively from the strip along the curved transverse lines 28a. The only waste of material will be that removed to form the opening 23a, the slugs removed to form slots A at each side of the barrel-forming tongue 17a, the sections removed between the curved slits 28a at adjacent ends of successive blanks B, and material removed at the pair of openings C which produces notches at the inner end of the loop portion 22a to facilitate its bending. In forming the link 15 from the blank B, as indicated in FIGURE 6, the blades 20 may be formed by bending the opposite curved ends 20a in opposite directions out of the plane of the blank. Then the loop portion 22a may be bent outwardly in one direction and forwardly and the barrel tongue portion 17a may be bent outwardly in the other direction and around rearwardly. Thus, the links can be formed successively from a strip of material with very little scrap.

Due to the special shape of the chain links and the chain resulting from a plurality of such interlocking links, special supporting and driving sprockets are preferably provided according to our invention for supporting and driving the chain. Each sprocket 30 includes a hub 31 and a web having the driving teeth 32 formed thereon at angularly spaced intervals around the periphery thereof. Between the teeth 32 are the notches 33 which are adapted to successively receive the inwardly extending push-blades 20 on the successive links of the chain. Laterally oppositely extending stop pins 34 are provided on the teeth 32 to limit twisting of the links as they pass around the sprocket. Thus, the sprocket not only is provided with driving teeth 32 which extend into the openings 23 of successive links and engage the barrel portions 17 of the preceding links but are also provided with following notches 33 which receive the inwardly directed push-blades 20.

In the preceding description, we have disclosed the structure of the chain links 15, the manner in which they interlock to form a chain of desired length, and the structure of the sprockets which support and drive the chain. In FIGURES 8–11, we have illustrated an example of how this chain may be employed. The chain may be directed to various horizontal and vertical positions or even angular positions between horizontal and vertical, horizontal and vertical positions being illustrated in FIGURE 8 but angular positions not being shown. FIGURE 9 shows how the twist in the vertical run of the chain makes it possible to direct the chain in different vertical planes as shown in FIGURE 8. In the example of FIGURE 8, a feed hopper 35 is illustrated as having horizontal open troughs 36 extending therefrom. Other horizontal troughs, such as 37, may be at different levels. At these horizontal troughs, the animals will have access to the feed conducted therealong and at each of these troughs an associated semicircular outer feed trough section 37a may be provided for receiving the feed spilled out of the smaller trough 37. Other shapes of larger troughs may be associated with smaller troughs in which the chain operates or the chain may be positioned in larger troughs or loading bunk bins. The system may also include vertical pipe-like or closed conduit sections 38. Corner structures are indicated at 39 and similar structures may be disposed in horizontal or vertical planes as necessary. The sprocket 30 may be driven by a suitable belt and pulley drive 40, for example, from an electric motor 41.

It will be apparent that with this arrangement the chain will be continuous and will be driven so as to conduct the feed from the hopper 35 through all the various conduit sections, both horizontally and vertically disposed, in a closed circuit back to the hopper. The chain is sufficiently flexible that it can pass around the various corners in a horizontal plane. However, it can also pass from a horizontal to a vertical plane around a corner since it not only can flex considerably in a direction normal to its longitudinal axis or path of movement and can flex laterally to a limited extent but also can twist about its axis. It is this latter characteristic which aids considerably its passage around a corner from one plane to another. The pintle-engaging bearing surfaces 18 are convexly curved in both directions and since they engage the straight edges 26 of the pintles 24, they facilitate pivoting both laterally in the plane of the chain and relative twisting of adjacent links about the axis of the chain. These surfaces 18 and cooperating straight edges 26 provide pintle-engaging surfaces of limited area which result in a substantially point contact. The barrels 17 are large relative to the thickness and area of the material of the pintles 24 so that there is a loose fit. Slippage and friction between interlocking links is held to a minimum. The chain links when disposed with their flat body portions relatively at right angles can be slipped apart readily because of the space provided at the barrel or hook 17 between the edge 19 and the dimple 21. However, this space is of a width to prevent the pintle 24 from passing outwardly therethrough under normal operating conditions of the chain. As indicated in FIGURE 11, when in the closed or annular conduit section 38, the cross-sectional area of the conduit will be substantially filled by the opposed material-engaging blades 20. Because these blades substantially fill the conduit, the twisting of the chain about its axis will have no undesirable effect on lifting of the material through the conduit. Furthermore, because the blades 20 are angled forwardly or in the direction of travel of the chain, they will function to pull the material away from the adjacent surfaces of the closed tube or open trough preventing material-accumulation on such surfaces. Also, since the two opposed blades are carried on each link, there will be a balanced action. When in an open semicircular horizontally disposed trough as in FIGURE 10, the downwardly projecting blades will scrape along the bottom of the trough 37 and will carry the material along the trough, and if the trough 37a is to have the material pulled therein over the chain, the upstanding blades 20 will carry it along. The sprockets which support and drive the chain are so designed that they will not interfere with the blades 20 of the chain.

Figure 7:
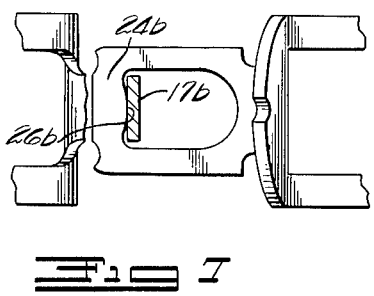
FIGURE 7 is a plan view, partly broken away, showing a modified chain link.

In FIGURE 7, we have illustrated a slightly modified form of our chain structure. In this case, the hook-shaped barrels 17b are straight across transversely and the inner edge 26b of each pintle portion 24b is transversely curved convexly. This is to obtain the limited area or substantially point contact which facilitates transverse flexing and twisting of adjacent links. The remainder of the link structure is identical with that previously described.

It will be apparent from the above that we have provided a chain and sprocket structure particularly useful for moving loose-particle material. Many advantages of this structure have been mentioned above and others will be apparent.

Having thus described our invention, what we claim is:

1. A chain composed of interlocking links, each of said links comprising a body having a pintle portion at one end and a hook-shaped barrel portion at its other end, the pintle of one link fitting within the barrel of an adjacent link, said body having material pusher-blades extending outwardly therefrom at longitudinally-spaced intervals and in opposite directions relative to the longitudinal plane of the body of the link.

2. A chain according to claim 1 in which both of said blades tilt in the direction of intended movement of the chain.

3. A chain according to claim 2 in which each of said blades is of substantially semicircular form with a curved outer edge so that the opposed blades on each link will cooperate to cover a circular transverse area.

4. A chain composed of interlocking links, each of said links comprising a substantially flat body having a barrel portion at one end extending outwardly from the plane of the body and a pusher-blade portion extending outwardly in the opposite direction from the plane of the body, a pusher-blade at the opposite end of the substantially flat body extending outwardly from the plane of the body in a direction opposite to that of the first pusher-blade, and a sprocket tooth receiving loop formed on the latter end of the body and extending longitudinally outwardly therefrom, said loop having a hole for receiving the sprocket tooth and a pintle portion at its outer extremity for cooperating with the barrel portion of an adjacent link.

5. A chain according to claim 4 in which said loop portion extends outwardly from the plane of the flat body at an acute angle in the same direction as the last-named pusher-blade portion.

6. A chain according to claim 4 in which said blade portions tilt in the direction of intended movement of the chain relative to said flat body.

7. A chain according to claim 6 in which said pusher-blade portions are of semicircular form with curved outer edges.

8. A chain according to claim 7 in which the pintle portion and barrel portion are provided with cooperating bearing surfaces to facilitate flexing and twisting of adjacent links, one of which is curved transversely and the other of which is straight transversely.

9. A chain according to claim 8 in which the pintle portion is a flat transverse strip having a straight inner edge which cooperates with a transversely curved surface on the barrel portion which is of curved hook form.

10. A chain according to claim 8 in which the pintle portion is a flat transverse strip having a transversely curved inner edge which engages the inner surface of the barrel portion which is of curved hook form.

11. In combination with the chain of claim 4, a sprocket for receiving the chain, said sprocket having teeth for cooperating with the loops of successive links, and alternating notches for receiving the alternate pusher-blade portions which project inwardly as the chain passes around the sprocket.

12. The combination of claim 11 in which said sprocket has stop pins projecting laterally in opposite directions from said teeth and spaced inwardly from the extremities thereof.

References Cited by the Examiner

UNITED STATES PATENTS

| | | | |
|---|---|---|---|
| 722,788 | 3/1903 | White | 198—207 X |
| 2,279,862 | 4/1942 | Sinden | 198—172 |
| 2,836,984 | 6/1958 | Bendall | 74—249 |
| 3,015,380 | 1/1962 | McAuley | 198—176 |

EVON C. BLUNK, *Primary Examiner*.

R. E. KRISHER, *Assistant Examiner*.